United States Patent
Toosky et al.

(10) Patent No.: US 6,662,303 B1
(45) Date of Patent: Dec. 9, 2003

(54) WRITE PRECOMPENSATION CIRCUIT AND READ CHANNEL WITH WRITE PRECOMPENSATION CIRCUIT THAT GENERATES OUTPUT SIGNALS BY INTERPOLATING BETWEEN SELECTED PHASES

(75) Inventors: Zabih Toosky, Santa Cruz, CA (US); Sasan Cyrusian, Santa Cruz, CA (US); Ulrich Huewels, Santa Cruz, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/480,875

(22) Filed: Jan. 10, 2000

(51) Int. Cl.[7] .............................. G06F 1/12; G06F 7/00
(52) U.S. Cl. .................. 713/400; 713/500; 713/503; 713/600; 711/167
(58) Field of Search .................. 713/400, 401, 713/500, 503, 600; 711/167; 369/47.28, 47.29, 47.3, 47.31, 47.32, 124.14, 275.1; 327/2, 3, 141, 144, 231

(56) References Cited

U.S. PATENT DOCUMENTS

| | | |
|---|---|---|
| 3,911,368 A | 10/1975 | Tarczy-Hornoch |
| 4,607,295 A | 8/1986 | Uno |
| 5,485,490 A | 1/1996 | Leung et al. |
| 6,002,279 A * | 12/1999 | Evans et al. .................. 327/144 |
| 6,009,534 A | 12/1999 | Chiu et al. |
| 6,094,082 A * | 7/2000 | Gaudet ........................ 327/270 |
| 6,121,808 A * | 9/2000 | Gaudet ........................ 327/231 |
| 6,122,336 A * | 9/2000 | Anderson .................... 375/371 |
| 2002/0000853 A1 * | 1/2002 | Chen et al. ................. 327/156 |
| 2002/0015247 A1 * | 2/2002 | Rosky et al. ................. 360/45 |

FOREIGN PATENT DOCUMENTS

JP  09259528 A  * 10/1997  ........... G11B/20/10

OTHER PUBLICATIONS

Kellis, J,; Mehrotra, S., "A 15Mb/s data separator and write compensation circuit for Winchester disk drives", Solid-–State Circui Conference. Digest of Technical Papers. 1986 IEEE International, vol.: XXIX, Feb. 1986, pp.: 232–233.*

Garlepp et al., A Portable Digital DLL for High Speed CMOS Interface Circuits, IEEE Journal of Solid State Circuits, May 1999.

* cited by examiner

*Primary Examiner*—Thomas Lee
*Assistant Examiner*—James K. Trujillo
(74) *Attorney, Agent, or Firm*—Fish & Richardson P.c.

(57) ABSTRACT

An improved write precompensation circuit. Eight phases from a PLL phase oscillator are received as inputs into a bank of four phase blenders (104). The phase blenders (104) output a 0%, 25%, 50%, or 75% interpolation to the adjacent phases. A multiplexer (110) is then used to select which of the phase outputs is used for the write precompensation.

12 Claims, 7 Drawing Sheets

Multiplexor Control Logic Truth Table

| WPR<4:0> | Z mux | S mux | A mux; B mux | Output mux |
|---|---|---|---|---|
| 00000 | Ph0 | Ph1 | Ph0, Ph1 | Ph0.00 |
| 00001 | Ph0 | Ph1 | Ph0, Ph1 | Ph0.25 |
| 00010 | Ph0 | Ph1 | Ph0, Ph1 | Ph0.50 |
| 00011 | Ph0 | Ph1 | Ph0, Ph1 | Ph0.75 |
| 00100 | Ph2 | Ph1 | Ph1, Ph2 | Ph1.00 |
| 00101 | Ph2 | Ph1 | Ph1, Ph2 | Ph1.25 |
| 00110 | Ph2 | Ph1 | Ph1, Ph2 | Ph1.50 |
| 00111 | Ph2 | Ph1 | Ph1, Ph2 | Ph1.75 |
| 01000 | Ph2 | Ph3 | Ph2, Ph3 | Ph2.00 |
| 01001 | Ph2 | Ph3 | Ph2, Ph3 | Ph2.25 |
| 01010 | Ph2 | Ph3 | Ph2, Ph3 | Ph2.50 |
| 01011 | Ph2 | Ph3 | Ph2, Ph3 | Ph2.75 |
| 01100 | Ph4 | Ph3 | Ph3, Ph4 | Ph3.00 |
| 01101 | Ph4 | Ph3 | Ph3, Ph4 | Ph3.25 |
| 01110 | Ph4 | Ph3 | Ph3, Ph4 | Ph3.50 |
| 01111 | Ph4 | Ph3 | Ph3, Ph4 | Ph3.75 |
| 10000 | Ph4 | Ph5 | Ph4, Ph5 | Ph4.00 |
| 10001 | Ph4 | Ph5 | Ph4, Ph5 | Ph4.25 |
| 10010 | Ph4 | Ph5 | Ph4, Ph5 | Ph4.50 |
| 10011 | Ph4 | Ph5 | Ph4, Ph5 | Ph4.75 |
| 10100 | Ph6 | Ph5 | Ph5, Ph6 | Ph5.00 |
| 10101 | Ph6 | Ph5 | Ph5, Ph6 | Ph5.25 |
| 10110 | Ph6 | Ph5 | Ph5, Ph6 | Ph5.50 |
| 10111 | Ph6 | Ph5 | Ph5, Ph6 | Ph5.75 |
| 11000 | Ph6 | Ph7 | Ph6, Ph7 | Ph6.00 |
| 11001 | Ph6 | Ph7 | Ph6, Ph7 | Ph6.25 |
| 11010 | Ph6 | Ph7 | Ph6, Ph7 | Ph6.50 |
| 11011 | Ph6 | Ph7 | Ph6, Ph7 | Ph6.75 |
| 11100 | Ph6 | Ph7 | Ph7, Ph6 | Ph7.00 |
| 11110 | Ph6 | Ph7 | Ph7, Ph6 | Invalid state |

WRITE PRECOMPENSATION CIRCUIT AND READ CHANNEL WITH WRITE PRECOMPENSATION CIRCUIT THAT GENERATES OUTPUT SIGNALS BY INTERPOLATING BETWEEN SELECTED PHASES

BACKGROUND OF THE INVENTION

The present invention relates to disk drive read/write channels and, particularly, to a system and method for write precompensation using phase interpolation techniques.

In hard disk drives, data is written on magnetic media by induction of magnetic fields caused by passing a current through the thin film head inductor. Ones and zeros are written on the media as magnetic field transitions. When two magnetic field transitions occur too closely to one another, the demagnetization field from an already-written transition causes a non-linear distortion or shift in the bit location of the next transition. This distortion or shift is referred to as non-linear bit shift.

Figure 1:
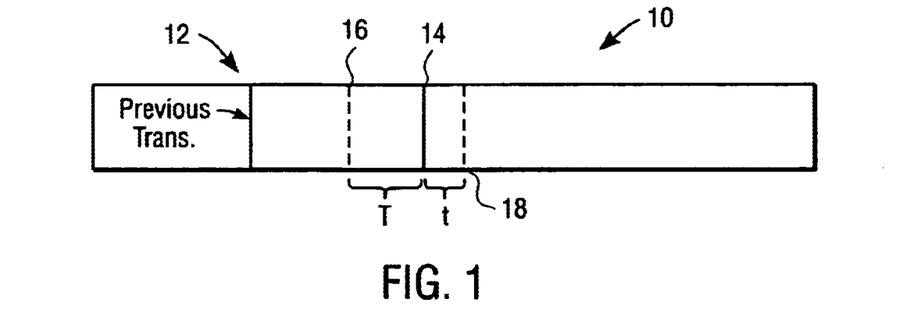
FIG. 1 is diagram schematically illustrating write precompensation.

Non-linear bit shift is compensated through a technique referred to as write precompensation. Write precompensation is illustrated in FIG. 1. A magnetic medium 10 is shown. A previous transition has been written at 12. The next transition should be written at 14. However, if it is written at 14, the previous transition will attract it and it will be written earlier, at 16, with a shift of T. Write precompensation determines a period t after time 14 to write the next transition at 18. The transition at 18 will be attracted to the previous transition and will be written at the desired correct time 14.

The period t is relatively small, and in particular, is smaller than can be resolved using the system's phase locked loop (PLL). As such, there is a need for an improved, high resolution write precompensation circuit.

SUMMARY OF THE INVENTION

A write precompensation circuit according to the present invention employs a phase blender to increase the resolution of the output phases of a phase locked loop circuit. According to one implementation, eight phases from a PLL phase oscillator are received as inputs into a bank of four phase blenders. The phase blenders output a 0%, 25%, 50%, or 75% interpolation to the adjacent phases. A multiplexer is then used to select which of the phase outputs is used for the write precompensation. According to one implementation, a reference and three delay clocks are provided. Each delay is programmable by a five bit number and the actual delay is performed by selecting one of eight input phases or an interpolation thereof.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–8 illustrate a write precompensation circuit according to an embodiment of the present invention. The write precompensation circuit selects eight phases from a phase locked loop (PLL) ring oscillator and employs a bank of phase blenders to interpolate the phases.

Figure 2:
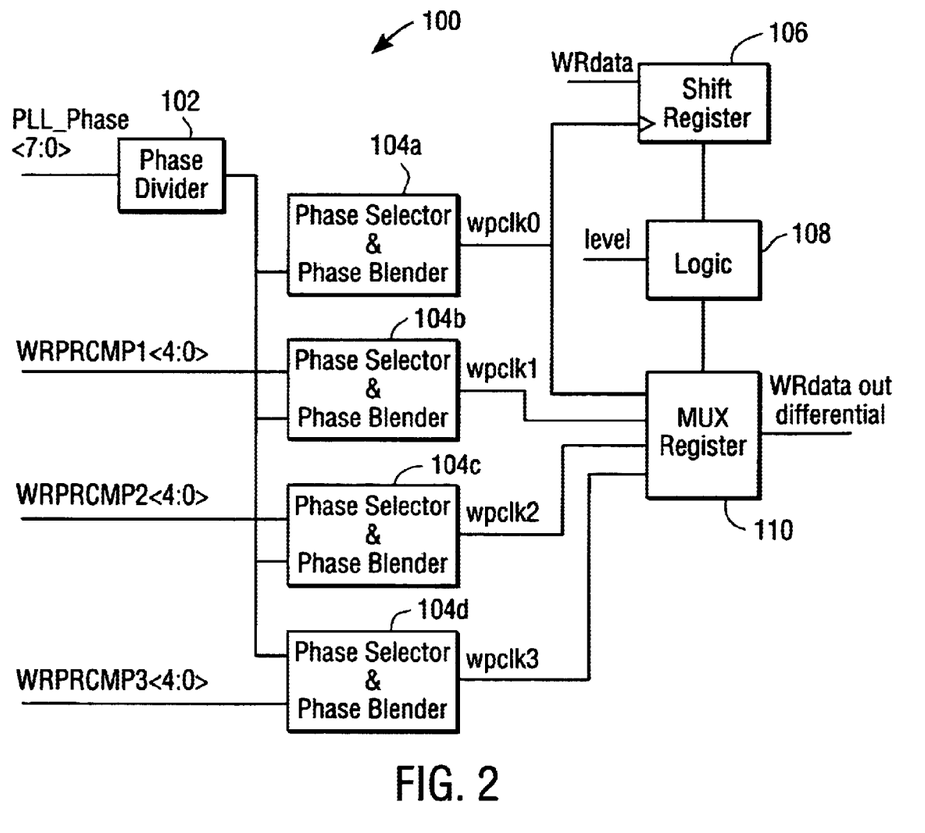
FIG. 2 is diagram illustrating a write precompensation circuit according to an embodiment of the invention.

As shown in FIG. 2, a write precompensation system 100 includes a phase divider 102 for receiving phases of a ring oscillator (not shown). The outputs of the phase divider are provided to one or more phase selector and blender units 104a–104d. As will be explained in greater detail below, the phase selector and blender units 104a–104d are used to interpolate and generate phases of greater resolution than the ring oscillator can provide. Each phase selector and phase blender unit 104a–104d generates an output that is a predetermined fractional interpolation of adjacent phases (e.g., 0%, 25%, 50%, 75%). Each phase selector and phase blender unit 104 receives as input five write precompensation control signals (WRPRCMPx<4:0>), which are used to select the interpolation increments or delays. In particular, the write precomp delay is programmable in increments of 3.125% of the write clock period. The write precompensation circuit 100 further includes a shift register 106, a control logic unit 108, and a mux register 110, which are used to select the particular phase, as will be explained in greater detail below. In the implementation illustrated, WPCLK0 is a reference clock, and WPCLK1 through WPCLK3 are each delayed relative to WPCLK0, as will be described in greater detail below.

Figure 3:
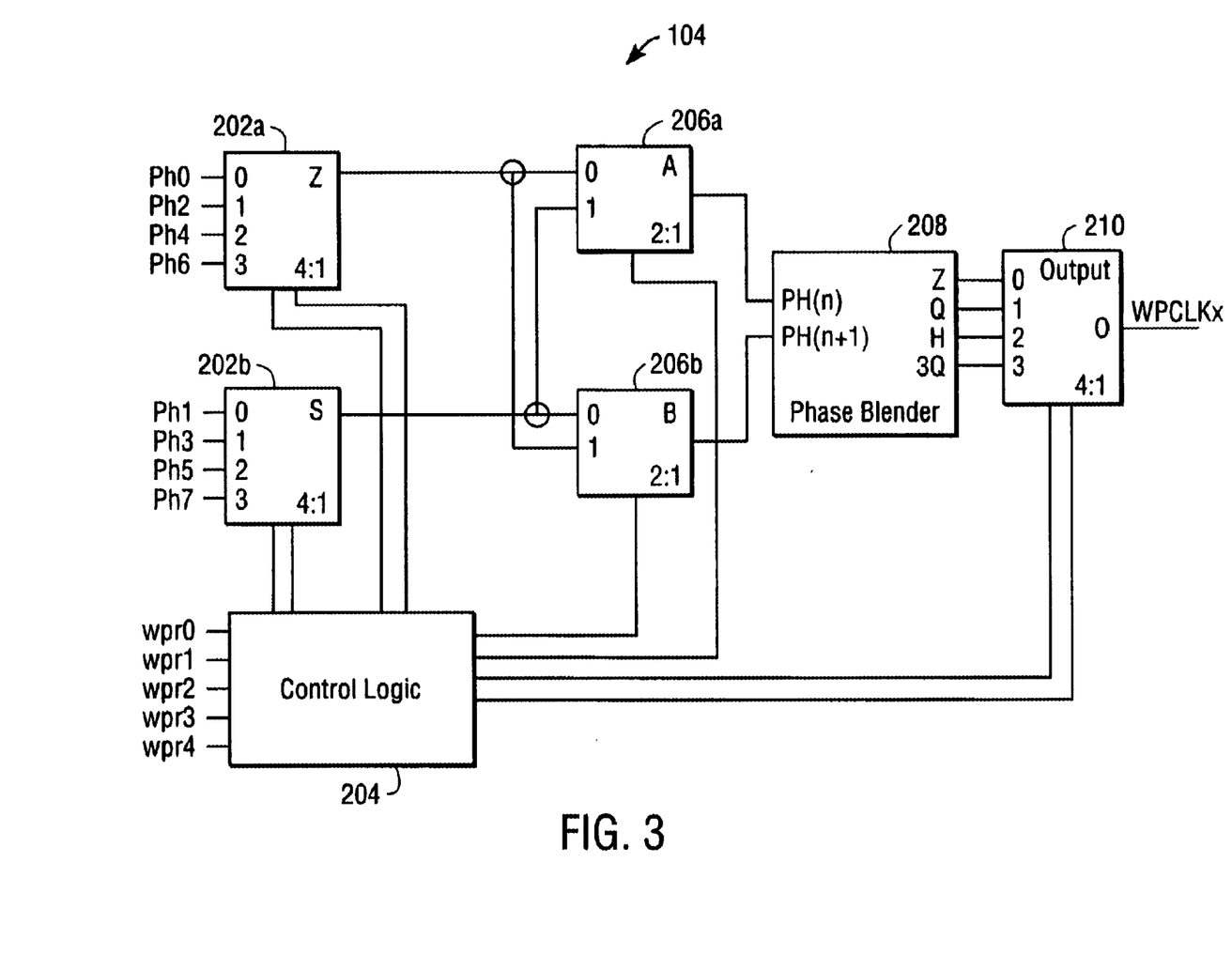
FIG. 3 is diagram of a phase blender and selector unit according to an embodiment of the invention.

The phase selector and blender unit 104 of FIG. 2 is shown in greater detail in FIG. 3. The phase selector and blender circuit 104 functions to delay the clock edges. As will be described in greater detail below, clock edge delay is performed by either selecting one of the eight PLL phases PH0–PH7 or an interpolation between the adjacent phases.

As illustrated, the phase selector and blender 104 includes a pair of 4:1 multiplexers 202a, 202b (Z, S) which receive as inputs the phase signals from phase divider 102. In particular, the multiplexer 202a receives phase inputs PH0, PH2, PH4, and PH6, and the multiplexer 202b receives as inputs the phases PH1, PH3, PH5, and PH7. The outputs of the multiplexers 202a, 202b are provided to multiplexers 206a, 206b (A, B). The outputs of the multiplexers 206a, 206b are provided to the phase blender unit 208. The phase blender 208 performs the interpolation, as will be discussed in greater detail below. The phase blender 208's outputs are provided to the multiplexer 210.

Clock edge delay is programmable by the five bits WPR<4:0>, which are input to the control logic unit 204. The various multiplexers and the control logic unit 204 select either one of the phase inputs of one of the interpolated phases as the output. As will be explained in greater detail below, as shown, the multiplexers 202a, 202b are used to select adjacent phases. Further, as shown, the multiplexers 206a, 206b are used to arrange the phases in increasing order for input to the phase blender unit 208. Further, as will be explained in greater detail below, the outputs Z, Q, H, and 3Q of the phase blender 208 are 0% interpolation (i.e., PH(n) being propagated through), 25% interpolation, 50% interpolation, and 75% interpolation, respectively.

Figure 5:
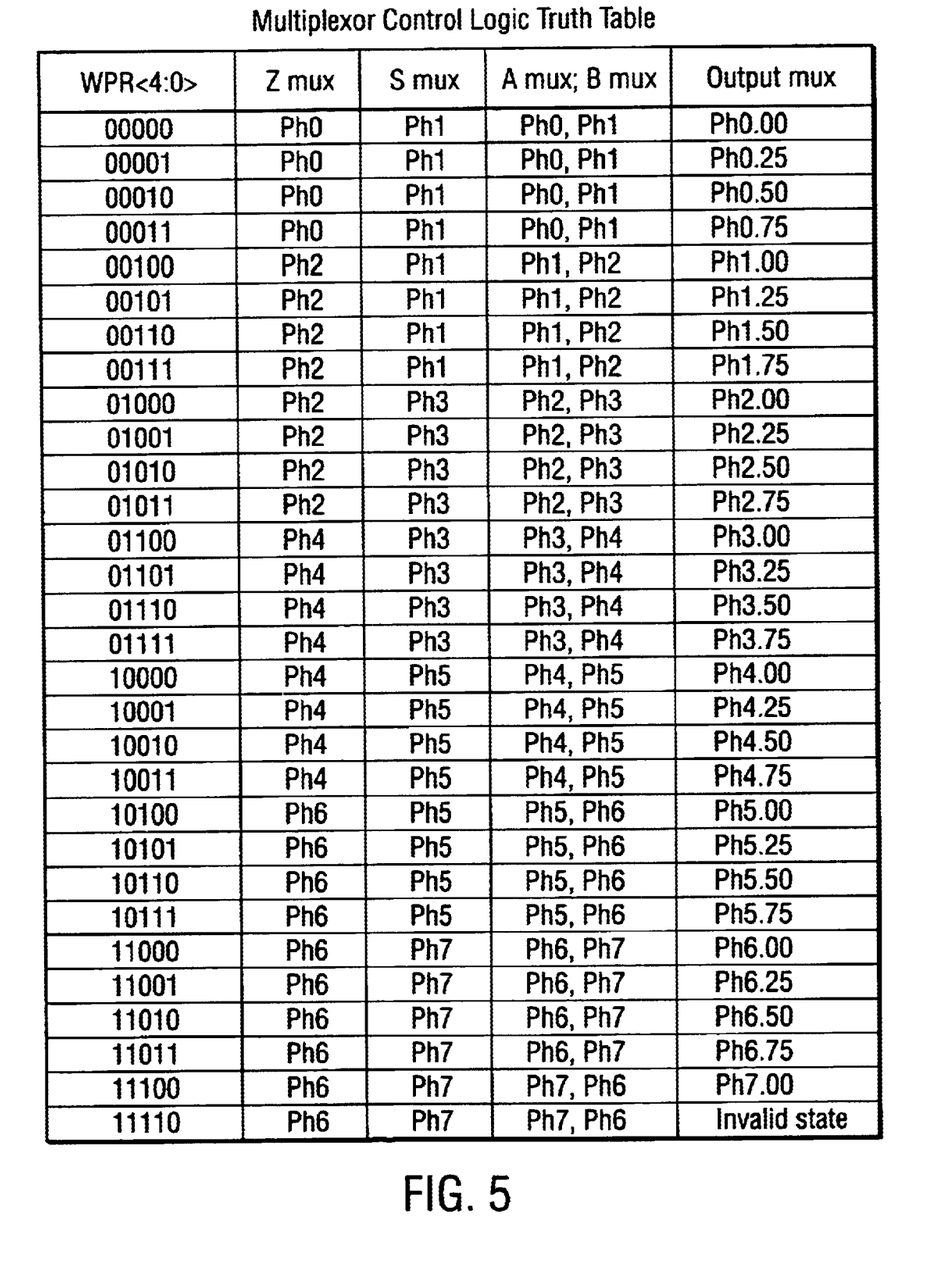
FIG. 5 is a table illustrating control logic for the phase blender and selector unit of FIG. 3.

In particular, shown in FIG. 5 is a truth table of the inputs WPR<0:4>to the control logic 204 and the corresponding multiplexer selections. It is noted that, generally, any logic suitable to select multiplexer outputs may be employed.

Figure 4:
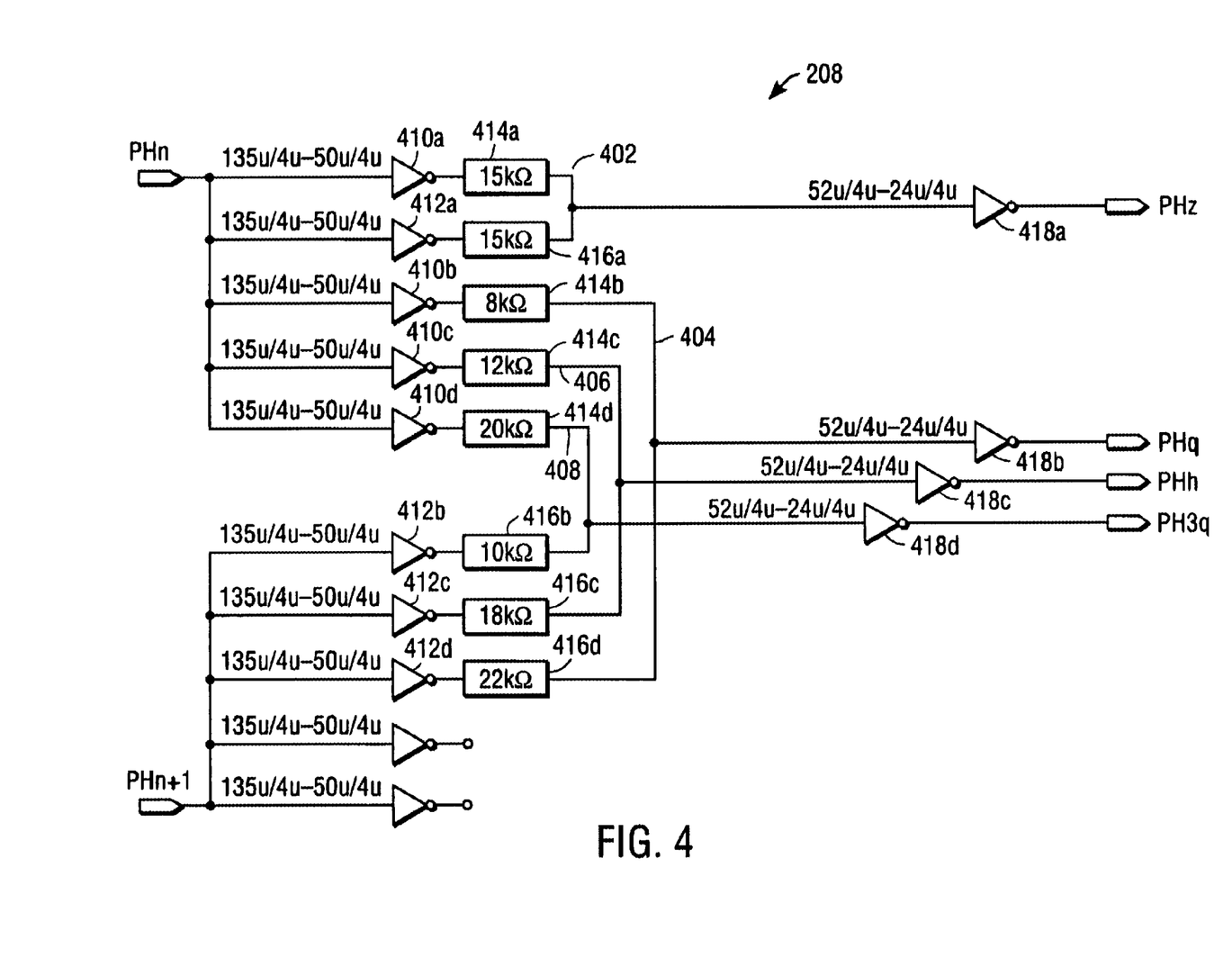
FIG. 4 is a diagram illustrating in greater detail a phase blender unit of FIG. 3.

The phase blender unit 208 is shown in greater detail in FIG. 4. As illustrated, the phase blender unit 208 receives as input two adjacent phases PH(n) and PH(n+1). As noted above, the phase blender unit produces outputs of PHz, PHq, PHh, and PH3q, i.e., 0%, 25%, 50%, and 75% phase interpolation between the phases PH(n) and PH(n+1). In particular, the phase blender unit 208 includes four interpolators 402, 404, 406, 408. Each of the interpolators has two input inverters (410a–410d, 412a412d) in series with resistors (414a–414d, 416a–416d, respectively), and an output inverter (418a–418d, respectively). Each interpolator 404–408 receives an input PH(n) and an input PH(N+1) and performs an interpolation, depending on the selected value of the resistors. The interpolator 402 receives both inputs PH(n) because it simply propagates the PH(n) through as PHz.

As shown, resistor 414a is 15 k ohm, resistor 416a is 15 k ohm, resistor 414b is 8 k ohm, resistor 414c is 12 k ohm, resistor 414d is 20 k ohm, resistor 416b is 10 k ohm, resistor 416c is 18 k ohm, and resistor 416d is 22 k ohm. It is noted that other values for the resistors may be selected to achieve the desired percentage interpolations. Moreover, the pairs of resistors may have different values if other percentage interpolations are desired. Thus, the figures are exemplary only.

Figure 8A:
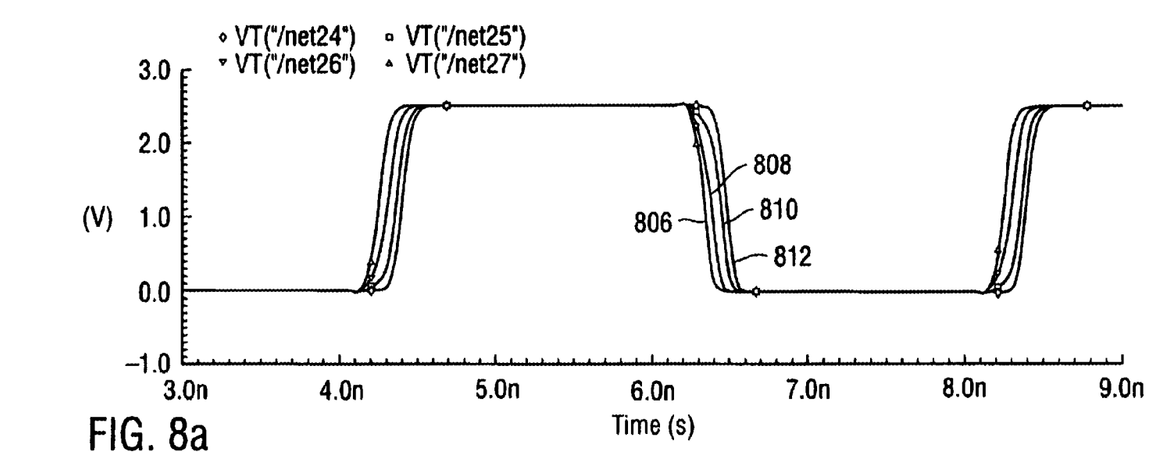
FIGS. 8A and 8B are timing diagrams illustrating phase interpolation according to an embodiment of the present invention.
Figure 8B:
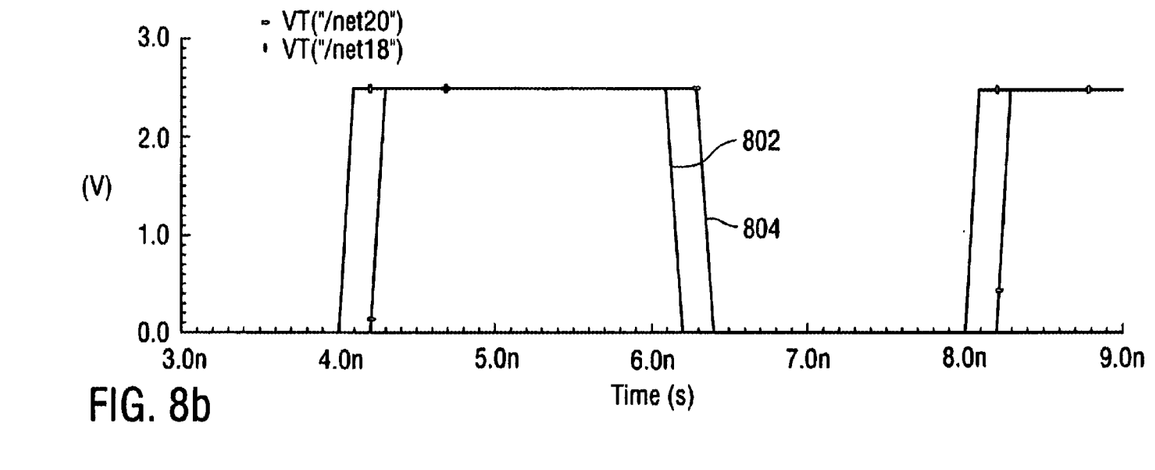

FIG. 8A and FIG. 8B illustrate sample timing diagrams for the phase blender 104. In particular, FIG. 8B illustrates two adjacent phases 802, 804. The corresponding interpolated phases output from the phase blender 104 are shown in FIG. 8A as waveforms 806, 808, 810, and 812.

Figure 6:
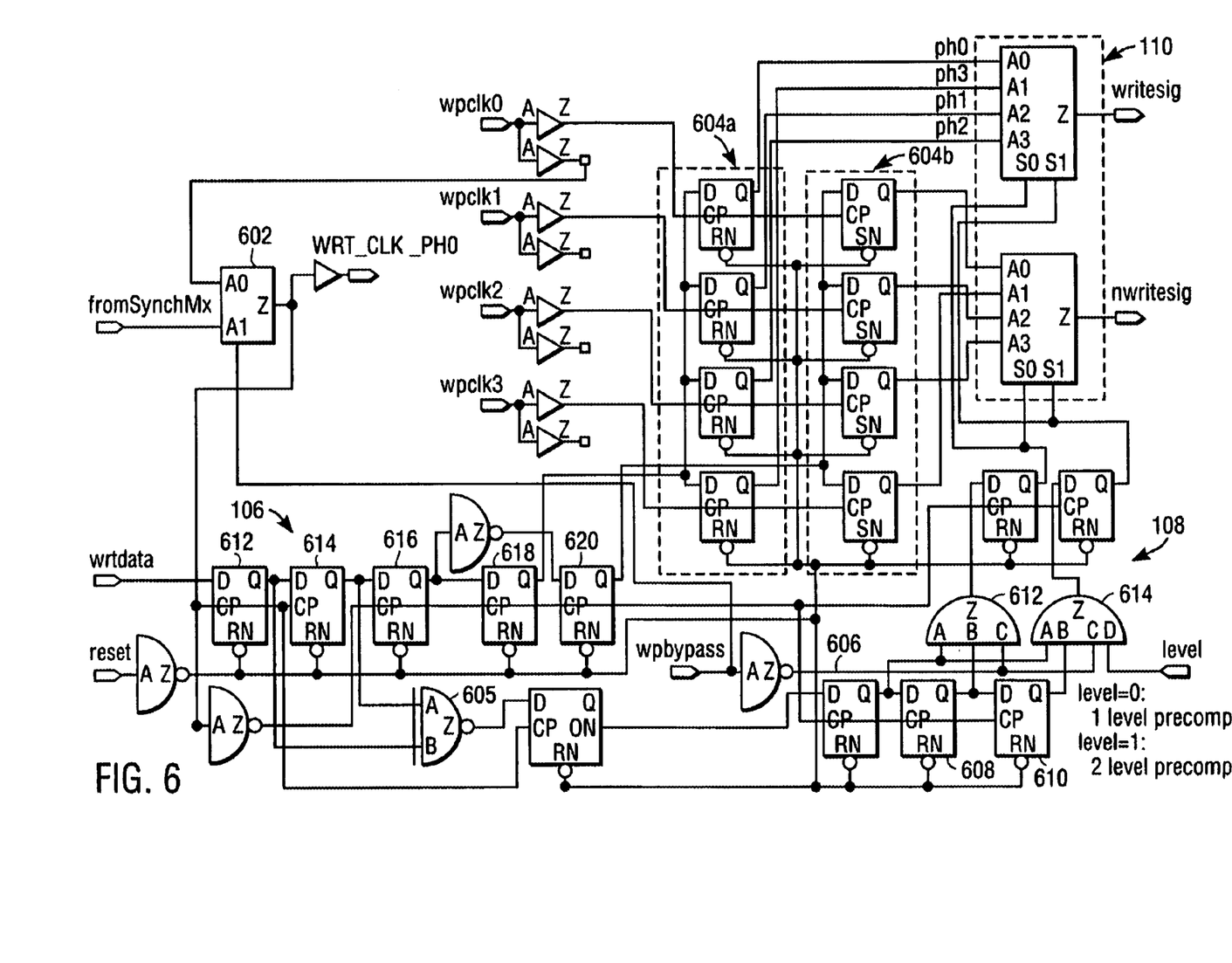
FIG. 6 is a diagram illustrating in greater detail various components of an embodiment of the present invention.

A diagram of the shift register 106, logic unit 108, and mux register 110 is shown in FIG. 6. As will be explained in greater detail below, RESET, WPBYPASS, LEVEL and SynchMUX control signals are received from system logic (not shown). The SynchMUX signal is received at a multiplexer 602 which synchronizes the write data to the WPCLK0. The mux 602 output clocks the shift register 106, whose outputs are then provided to the banks of D flip flops 604a, 604b which, in conjunction with flip flops 618, 620, are used to derive a differential output for increased noise margin. It is noted that in other implementations, a single ended signal may be provided. The banks of D flip flops 604a, 604b receive as clock inputs the WPCLK0–WPCLK3 phase outputs from the phase blenders 104a–104d.

Serial encoded WRTDATA is input to the shift register 106, which includes flip flops 612, 614, 616. Transition information about the shifted data is received at an XOR gate 605. In particular, the XOR gate 605 receives the shifted outputs from the flip flops 612, 614 stores transition information in the flip flops 606, 608, 610. A logic 1 stored in flip flop 610 means that there was a transition at time T-3; a logic 1 stored in flip flop 608 means there was a transition at time T-2; and a logic 1 in flip flop 606 means that there was a transition at time T-1. The serial data is then clocked out according to the Table 1 below.

Thus, the outputs of the D flip flops 604a, 604b are the appropriate write precompensated WRTDATA. The outputs of the D flip flops 604a, 604b are provided to the mux register 110. The mux register 110 is controlled by the logic 108 according to Table 1 below.

The selection of the mux register 110 outputs is based on the LEVEL control signal provided to AND gate 614 and the WPBYPASS signal provided to the AND gate 612 and AND gate 614. The WPBYPASS control causes data to be clocked with WPCLK0 via the mux 602 when the frequency is below a predetermined threshold. The LEVEL control signal selects either first or second level of precompensation as shown in Table 1 below.

TABLE 1

| T--3 | T-2 | T-1 | CLKPhase | LEVEL |
|---|---|---|---|---|
| Transition | No Transition | Transition | WPCLK1 | 2 |
| Transition | Transition | Transition | WPCLK2 | 2 |
| No Transition | Transition | Transition | WPCLK3 | 2 |
| X | Transition | Transition | WPCLK3 | 1 |

Figure 7:
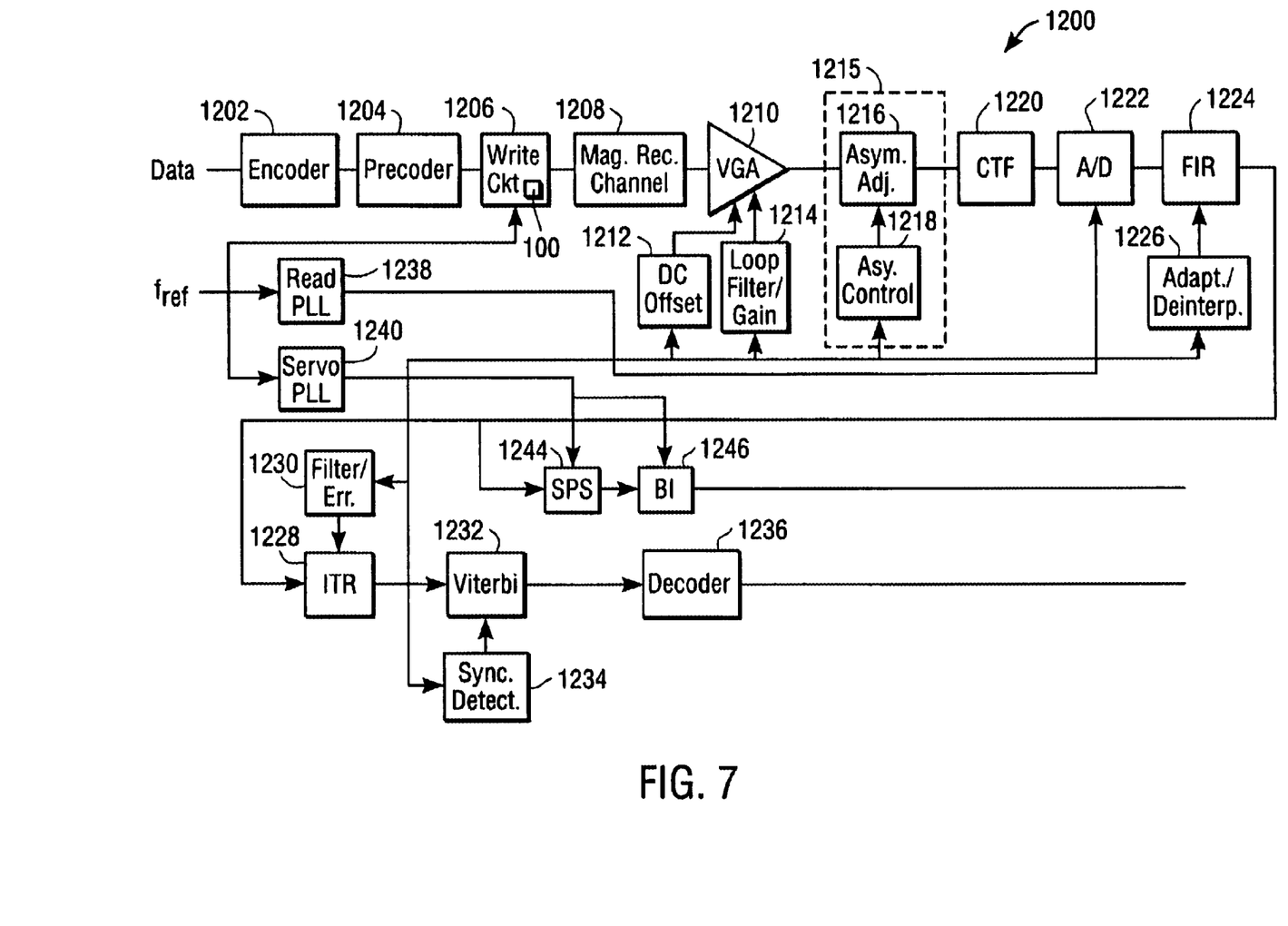
FIG. 7 is a sample amplitude read channel employing the write precompensation according to an embodiment of the invention.

A block diagram of a sampled amplitude read channel 1200 employing write precompensation according to an embodiment of the invention is shown in FIG. 7. During a write operation, data is written onto the media. The data is encoded in an encoder 1202, such as an RLL or other encoder. A precoder 1204 precodes the sequence to compensate for the transfer function of the magnetic recording channel 1208 and equalizing filters. The write circuitry 1206 includes write precompensation according to the present invention and further modulates the current in the recording head coil onto record a binary sequence onto the medium. A reference frequency $f_{ref}$ provides a write clock to the write circuitry 1206.

The bit sequence is then provided to a variable gain amplifier 1210 to adjust the amplitude of the signal. DC offset control 1212 and loop filter/gain error correction 1214 may be provided to control the adjustment of the VGA 1210. Further, an asymmetry control unit 1215 including an asymmetry adjustment unit 1216 and asymmetry control 1218 may be provided to compensate for magneto-resistive asymmetry effects.

The signal is then provided to a continuous time filter 1220, which may be a Butterworth filter, for example, to attenuate high frequency noise and minimize aliasing into baseband after sampling. The signal is then provided to an analog to digital converter 1222 to sample the output of the continuous time filter 1220.

A finite impulse response filter 1224 provides additional equalization of the signal to the desired response. The output of the FIR 1224 is provided to an interpolated timing recovery unit 1228 which is used to recover the discrete time sequence. The output of the interpolated timing recovery unit is used to provide a feedback control to the DC offset control 1212, the gain error 1214, the asymmetry control 1218 and the FIR 1224 control 1226. The output of the interpolated timing recovery 1228 is provided to a Viterbi detector 1232 to provide maximum likelihood detection. Further, the ITR output is provided to a sync detector 1234. The sync detector 1234 detects the sync mark using phase information gleaned from having read the immediately preceding preamble. This information is then provided to the Viterbi detector 1232 for use in sequence detection. The Viterbi detector output is then provided to the decoder 1236 which decodes the encoding provided by the encoder 1202. The invention described in the above detailed description is not intended to be limited to the specific form set forth herein, but is intended to cover such alternatives, modifications and equivalents as can reasonably be included within the spirit and scope of the appended claims.

What is claimed:

1. A write precompensation circuit, comprising:

a plurality of phase selector and blender units, each of the plurality of phase selector and blender units receiving a plurality of phase signals and receiving a plurality of write recommendation control signals, each of the phase selector and blender units configured to generate an output controlled by the plurality of write recommendation control signals by selecting pairs of phase signals having different input phases and interpolating between the selected pairs of phase signals; and synchronization circuitry that receives the output from at least one of the plurality of phase selector and blender units and receives original write data and generates precompensated write data that is synchronized to the output.

2. A write precompensation circuit according to claim 1, each phase selector and blender unit comprising:

multiplexing circuitry for selecting the pairs of phase signals; and a phase blender for interpolating between said selected pairs of phase signals.

3. A write precompensation circuit according to claim 2, wherein the synchronization circuitry comprises phase selector multiplexing circuitry for selecting outputs of said plurality of phase selector and blender units.

4. A write precompensation circuit according to claim 2, each phase selector and blender unit comprising:

first and second multiplexers for selecting the pairs of phase signals; and third and fourth multiplexers for ordering outputs of said first and second multiplexers, wherein the phase blender receives outputs of said third and fourth multiplexers and generates two or more outputs; and a fifth multiplexer for selecting an output from the two or more outputs of said phase blender.

5. A write precompensation circuit according to claim 4, said phase blender comprising.

two or more interpolating circuitries adapted for interpolating between input phases of the selected pairs phase signals.

6. A write precompensation circuit according to claim 5, wherein said two or more interpolating circuitries are configured to provide substantially 0%, 25%, 50%, and 75% interpolation between adjacent input phases.

7. A sampled amplitude read channel, comprising:

a magnetic recording channel;

a write precompensation circuit, including a plurality of phase selector and blender units, each of the plurality of phase selector and blender units receiving a plurality of phase signals and receiving a plurality of write recommendation control signals, each of the phase selector and blender unit configured to generate an output controlled by the plurality of write recommendation control signals by selecting pairs of phase signals having different input phases and interpolating between the selected pairs of phase signals; and synchronization circuitry that receives the output from at least one of the plurality of phase selector and blender units and receives original write data and generates precompensated write data that is synchronized to the output.

8. A sampled amplitude read channel according to claim 7, each phase selector and blender unit comprising:

a multiplexing circuitry for selecting the pairs of phase signals; and a phase blender for interpolating between said selected pairs of phase signals.

9. A sampled amplitude read channel according to claims 8, comprising phase selector multiplexing circuitry for selecting outputs of said plurality of phase selector and blender units.

10. A sampled amplitude read channel according to claim 9, each phase selector and blender unit comprising:

first and second multiplexers for selecting the pairs of phase signals;

third and fourth multiplexers for ordering outputs of said first and second multiplexers, wherein the phase blender receives outputs of said third and fourth multiplexers and generates two or more outputs; and a fifth multiplexer for selecting an output from the two or more outputs of said phase blender.

11. A sampled amplitude read channel according to claim 10, said phase blender comprising:

two or more interpolating circuitries adapted for interpolating between input phases of the selected pairs of phase signals.

12. A write precompensation circuit according to claim 11, wherein said two or more interpolating circuitries are configured to provide substantially 0%, 25%, 50%, and 75% interpolation between adjacent input phases.

* * * * *

UNITED STATES PATENT AND TRADEMARK OFFICE
CERTIFICATE OF CORRECTION

PATENT NO. : 6,662,303 B1
DATED : December 9, 2003
INVENTOR(S) : Ulrich Huewels, Zabih Toosky and Sasan Cyrusian It is certified that error appears in the above-identified patent and that said Letters Patent is hereby corrected as shown below:

Column 5,
Line 41, after "comprising" please delete "." and insert -- : -- therefor.

Column 6,
Line 24, please delete "claims" and insert -- claim -- therefor.

Signed and Sealed this

Twenty-ninth Day of June, 2004

JON W. DUDAS
*Acting Director of the United States Patent and Trademark Office*